US007551333B2

(12) United States Patent  (10) Patent No.: US 7,551,333 B2
Chien  (45) Date of Patent: Jun. 23, 2009

(54) BOOK SCANNER

(75) Inventor: Hsin-Tang Chien, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 11/892,184

(22) Filed: Aug. 21, 2007

(65) Prior Publication Data

US 2008/0165395 A1   Jul. 10, 2008

(30) Foreign Application Priority Data

Jan. 5, 2007   (TW) .............................. 96200267 U

(51) Int. Cl.
*H04N 1/04* (2006.01)
(52) U.S. Cl. ........................ 358/497; 358/474; 358/494; 358/483; 358/482; 399/362
(58) Field of Classification Search ................. 358/497, 358/494, 474, 483, 482, 475, 505, 509, 512–514; 399/362, 211; 355/25; 250/208.1, 234–236
See application file for complete search history.

(56) References Cited

U.S. PATENT DOCUMENTS 5,359,207 A  10/1994  Turner 7,268,923 B2 * 9/2007 Schroath et al. ............. 358/474
2002/0191994 A1 * 12/2002 Lee ............................. 399/362
2005/0237584 A1 * 10/2005 Lee et al. ..................... 358/474
2007/0109609 A1 * 5/2007 Guo ............................ 358/474
2008/0158618 A1 * 7/2008 Reese et al. ................. 358/474

FOREIGN PATENT DOCUMENTS

TW  531125  6/1990
TW  M277207  10/2005

* cited by examiner

*Primary Examiner*—Cheukfan Lee
(74) *Attorney, Agent, or Firm*—Rosenberg, Klein & Lee

(57) ABSTRACT

A book scanner for scanning two adjacent pages in documents bound in volume includes a housing, two image scanning units, and a conveying device. The housing has two scanning tables connected to each other. An included angle is formed between the two scanning tables and a crest line is formed at a connection of the two scanning tables. The two image scanning units are movably disposed in the housing to project a scanning light through a window of each scanning table respectively, so as to scan images of the two adjacent pages. The two image scanning units are connected to the conveying device to be supported and moved relative to the corresponding scanning tables in a direction parallel to the crest line, so as to be moved simultaneously and to scan the images of the two adjacent pages respectively.

9 Claims, 8 Drawing Sheets

BOOK SCANNER

CROSS-REFERENCE TO RELATED APPLICATIONS

This non-provisional application claims priority under 35 U.S.C. § 119(a) on Patent Application No(s). 096200267 filed in Taiwan, R.O.C. on Jan. 5, 2007, the entire contents of which are hereby incorporated by reference.

BACKGROUND OF THE INVENTION

1. Field of Invention

The present invention relates to a scanner, and more particularly, to a book scanner having two image scanning units for scanning two adjacent pages in documents bound in volume.

2. Related Art

When using a common photocopier or scanner to scan documents bound in volume, e.g., a book, the book has to be turned to the pages to be scanned, and two adjacent pages divided by a bookbinding cord are placed flatly on a scanning table of the photocopier or the scanner, enabling the photocopier or the scanner to scan the two adjacent pages simultaneously. However, such a scanning approach for two adjacent pages in documents bound in volume has two disadvantages. One is that when a book is opened and placed flatly on the scanning table, the area of the bookbinding cord will curve and rise due to the paper thickness, which makes a part of the pages near the bookbinding cord unable to be pressed flatly on the scanning table, resulting in twisted images. The other is that after being scanned by a single image scanning unit at the same time, the two adjacent pages would be regarded as a single image file, so it's difficult to recognize the bookbinding cord automatically and to archive the image files of the two pages separately, leading to inconveniences in subsequent processing and managing of image files.

In order to solve the above problems, a scanner having two scanning tables was provided for scanning two adjacent pages simultaneously, such as ROC Utility Model No. M277207, ROC Patent No. TW531125, and U.S. Pat. No. 5,359,207. The two scanning tables of a scanner in ROC Utility Model No. M277207, ROC Patent No. TW531125, or U.S. Pat. No. 5,359,207 are connected to each other to form an included angle therebetween, such that a crest line is formed at the connection of the two scanning tables. The bookbinding cord of a book is aligned and placed on the crest line, such that two adjacent pages are placed flatly on the two scanning tables respectively. Thus, the problem that the bookbinding area cannot be pressed flatly is solved.

The scanner disclosed in TW531125 has an image scanning unit with an inverse V-shaped cross-sectional area to fit to the two scanning tables. Two image scanning modules are disposed in the image scanning unit, and two adjacent pages in documents bound in volume are scanned through the two scanning tables respectively. However, the inverse V-shaped image scanning unit in Patent No. TW531125 is customized design, and is not compatible with other types of scanners, which causes inconveniences in management of product parts for manufactures. Also, as two image scanning modules are disposed in a single image scanning unit, each image scanning module cannot be adjusted individually according to the corresponding scanning table. If the manufacturing tolerances of the two scanning tables are different, the two scanning tables would cause different depths of field for corresponding image scanning modules. Therefore, images of the two adjacent pages would have different image scanning qualities, and additional image processing is required.

The scanner disclosed in M277207 has a traditional flat type image scanning unit. One image scanning module is disposed in the image scanning unit, and two adjacent pages in documents bound in volume are scanned through the two scanning tables by the image scanning unit. The image scanning unit is not disposed in parallel to both the two scanning tables. The depth of filed at the outer edge of the two adjacent pages is different from that near the connection of the two adjacent pages. Thus, the image of the two adjacent pages would be twisted, and it is difficult to perform the image processing to correct the twisted image, and the image quality cannot be improved.

The scanner disclosed in U.S. Pat. No. 5,359,207 employs 2-dimensional array light detectors attached, either rigidly or rotatably, at a common edge and disposed in a wedge shaped manner. The opposite edges of the arrays are housed in a base portion. These detectors comprise an array of thin film transistors and sensors that function as pixel element detectors. These thin film elements are generally constructed over a translucent substrate, such as glass, to form a two dimensional detecting surface. Two adjacent pages in documents bound in volume, which are prepared to be scanned, are place over the two arrays respectively. Moreover, the base portion additionally supports a backlight assembly and read-out electronics; the backlight provides the necessary illumination of the adjacent pages, such that the detectors of the arrays receive the light reflected by the pages and transform the light to image data. Then, the read-out electronics output the image data stored in the detectors to other processing units that may use such image data. However, the detectors are expensive, and are not widely used in scanners.

SUMMARY OF THE INVENTION

In view of the above problems, the objective of the present invention is to provide a book scanner for solving the problem of poor image quality when scanning two adjacent pages in documents bound in volume.

In order to achieve the above objective, the present invention provides a book scanner for scanning two adjacent pages in documents bound in volume. The book scanner includes a housing, two image scanning units, and a conveying device. The housing has two scanning tables connected to each other, wherein an included angle is formed between the two scanning tables, and then a crest line is formed at a connection of the two scanning tables. Each of the scanning tables has a window for light to be transmitted through, and the two adjacent pages are placed flatly on the two scanning table respectively. The two image scanning units are movably disposed in the housing, and are corresponding to the two scanning tables respectively. Each of the image scanning units having a light source is provided for projecting a scanning light through the window of each scanning table, and for scanning images of the two adjacent pages through the corresponding windows. The conveying device is disposed in the housing and located below the crest line. The two image scanning units are connected coaxially to the conveying device, and are moved together by the conveying device relative to the two scanning tables of the housing in a direction parallel to the crest line, so as to scan images of the two adjacent pages.

The advantage of the present invention is that images of two pages are scanned simultaneously by two image scanning units respectively while each image scanning unit can be regulated or corrected independently, thus image quality of the two adjacent pages is optimized, and thus the problem in prior art that the image quality is different or cannot be corrected is solved.

As for features and examples of the present invention, preferred embodiments are illustrated in detail below with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
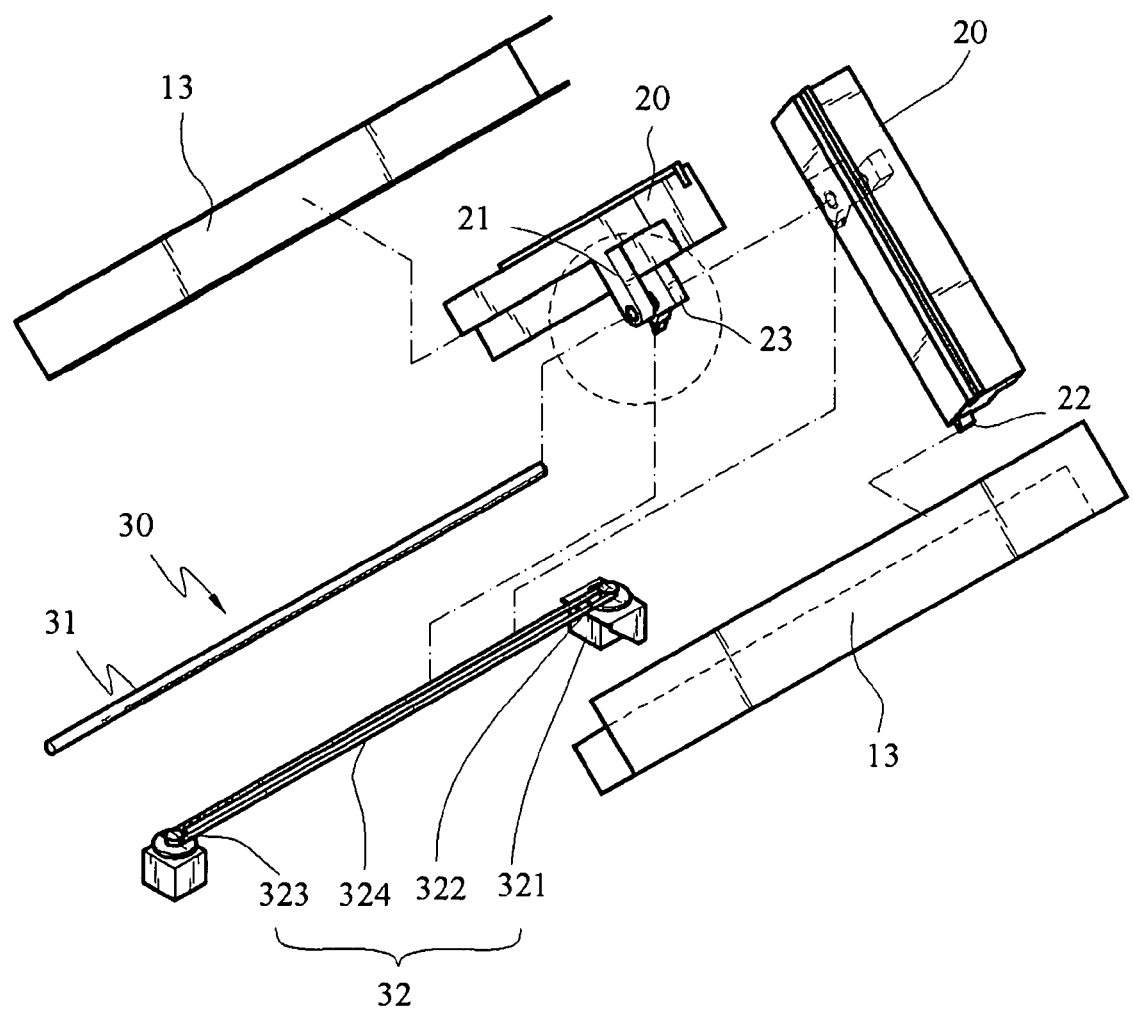
FIG. 1 is an exploded view of a part of the components of a first embodiment of the present invention.
Figure 2:
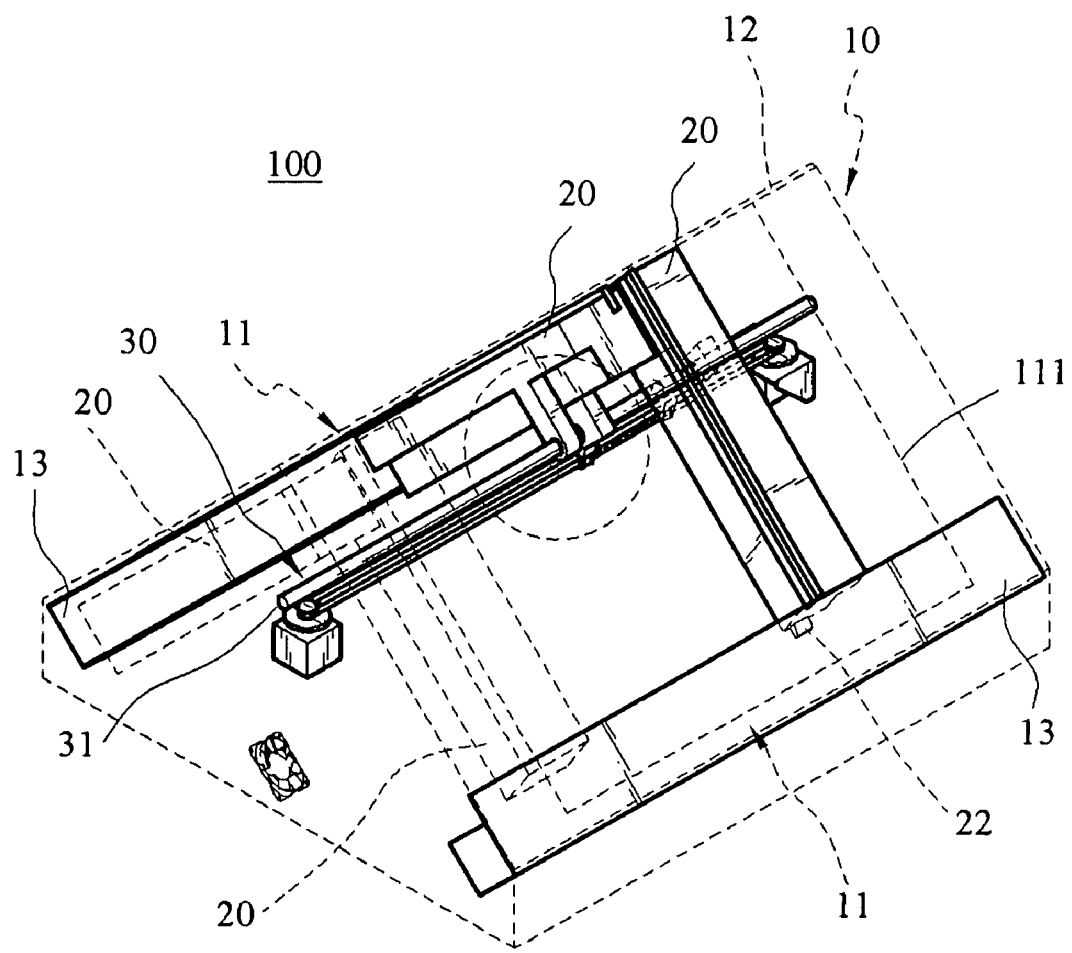
FIGS. 2 and 3 are perspective views of the first embodiment of the present invention.
Figure 3:
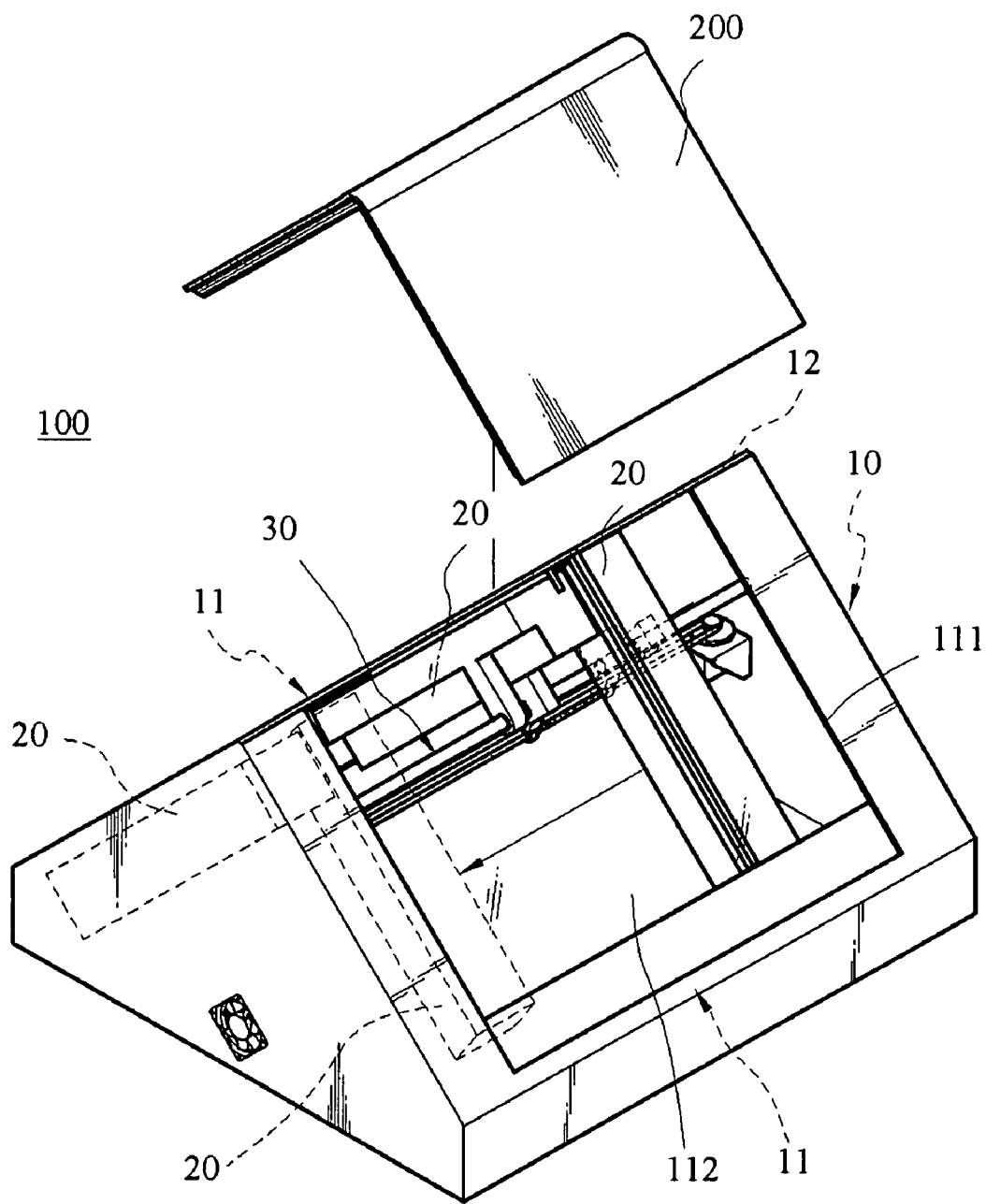

Referring to FIGS. 1, 2 and 3, a book scanner 100 of a first embodiment of the present invention is shown. The book scanner 100 is provided for scanning two adjacent pages in documents bound in volume, such as two adjacent pages in a book 200. The book scanner 100 includes a housing 10, two image scanning units 20, and a conveying device 30.

A space is defined inside the housing 10 for the image scanning unit 20 and the conveying device 30 being disposed therein. The housing 10 has two light transmittable scanning tables 11, and the two scanning tables 11 are connected to each other and formed on the top surface of the housing 10. An included angle is formed between the two scanning tables 11 and a crest line 12 formed at the connection of the two scanning tables 11. Each of the two scanning tables 11 has a window 111 formed therein, and the window 111 of each scanning table 11 is respectively covered by a transparent plate 112 for supporting a document sheet and for light to be transmitted through. The transparent plates 112 are provided for the pages in a book 200 to be placed flatly thereon and corresponding to the windows 111. Two guide rails 13 are further provided in the housing 10. The two guide rails 13 are respectively disposed on an edge away from the crest line 12 of the two scanning tables 11, and each guide rail 13 is spaced by the corresponding windows 111 and opposing to the crest line 12.

Two image scanning units 20 are disposed in the housing 10, and are corresponding to the two scanning tables 11 respectively. Notably, the image scanning units 20 are movably and run parallel with the two scanning tables 11. Each of the image scanning units 20 includes a light source and a photosensitive element. The light source can be a cold cathode fluorescent lamp, Xenon lamp, or a light-emitting diode array, for projecting scanning light through the windows 111. The photosensitive element can be CCD or CIS, for scanning images of the pages through the windows 111 of the scanning tables 11. One end of the two image scanning units 20 is corresponding to the crest line 12 of the housing 10, and is connected to the conveying device 30. The other end of the two image scanning units 20 respectively slides on the two guide rails 13, such that the two image scanning units 20 are movably disposed in the housing 10 to be moved by the conveying device 30 relative to the two scanning tables 11 of the housing 10. Since the two image scanning units 20 are supported by the conveying device 30 and the guide rails 13, each image scanning unit 20 is respectively in parallel to its corresponding scanning table 11, and moves in a direction parallel to the crest line 12 inside the scanning table 11 simultaneously, and scan the images of the pages placed on the two scanning tables 11 respectively.

The conveying device 30 is disposed in the housing 10 and located below the crest line 12, which includes a shaft 31 and a driving assembly 32. The shaft 31 is fixed in the housing 10, and located below and in parallel to the crest line 12. The driving assembly 32 includes a motor 321, driving pulley 322, a follower pulley 323, and a driving belt 324. The driving pulley 322 is connected to the motor 321 to be driven by the motor 321. The motor 321 and the follower pulley 323 are fixed in the housing 10, and are located corresponding to the two ends of the shaft 31 respectively. The driving belt 324 is installed to the follower pulley 323 and the driving pulley 322, so as to be driven by the driving pulley 322 and the motor 321 to drive the follower pulley 322. A line connecting the center of the follower pulley 323 and the driving pulley 322 is in parallel to the crest line, causing the driving belt 324 to generate a linear movement parallel to the crest line.

Referring again to FIGS. 1, 2, 4A and 4B, each image scanning unit 20 respectively has an extending portion 21 with a through hole 211 formed thereon and a bushing 211 inserted into the through hole 211. The shaft 31 of the conveying device 30 is inserted into the bushing to pass through hole 211 of the image scanning units 20, such that the image scanning units 20 can be moved one the shaft 31. By inserting the shaft 31 into the bushing to pass the through hole 211 of the image scanning units 20, one end of the two image scanning units 20 is supported below the crest line 12 of the housing 10.

Figure 4A:
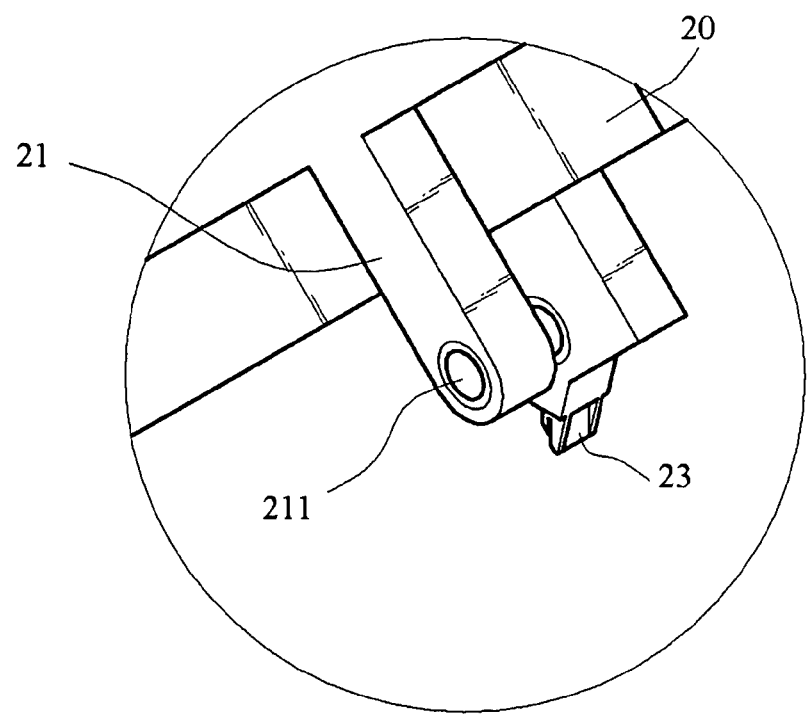
FIGS. 4A, 4B and 4C are enlarged perspective views of a part of the components of the first embodiment of the present invention.
Figure 4B:
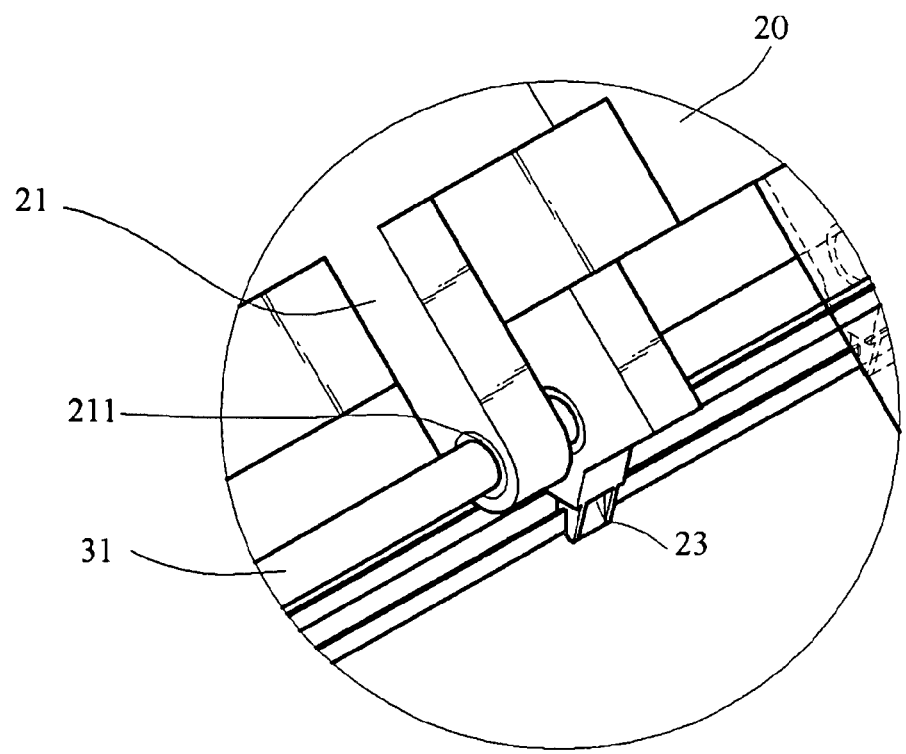
Figure 4C:
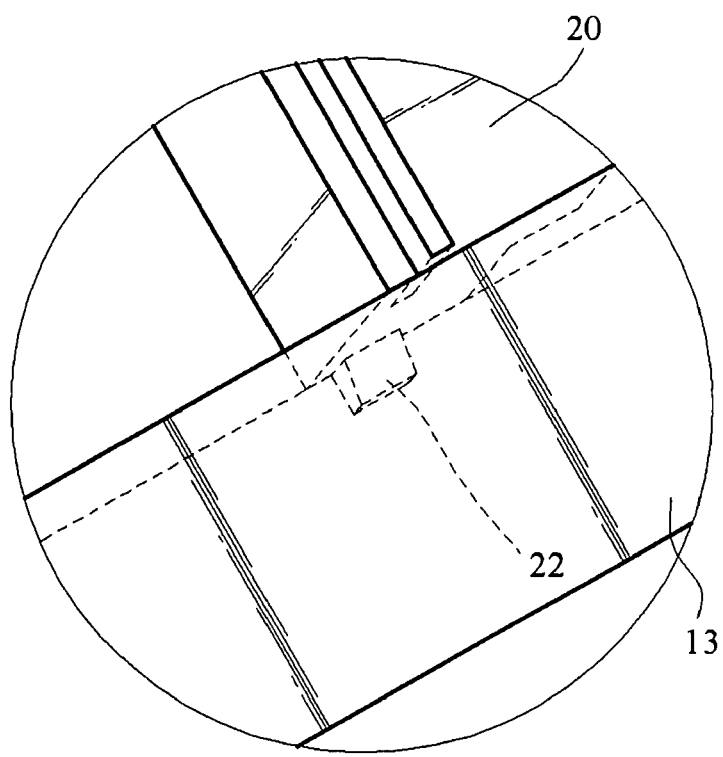

Referring to FIG. 4C, a slide element 22, such as a roller or a slide pad, is formed on the other end of each image scanning units 20 for sliding on the guide rail 13, such that the image scanning units 20 is supported to move relative to the scanning tables 11 in parallel when the image scanning units 20 are driven by the conveying device 30. A connecting portion 23 is further formed on each of the image scanning units 20. Each connecting portion 23 is combined with the driving belt 324, such that the image scanning unit 20 is connected to the driving belt 324 to be driven by the driving belt 324. When the motor 321 is actuated, the driving belt 324 is driven, and further drives the two image scanning units 20 together in a direction parallel to the crest line 12. Thus, the two image scanning units 20 respectively scan the images of the pages placed on the two scanning tables 11 simultaneously.

Figure 5:
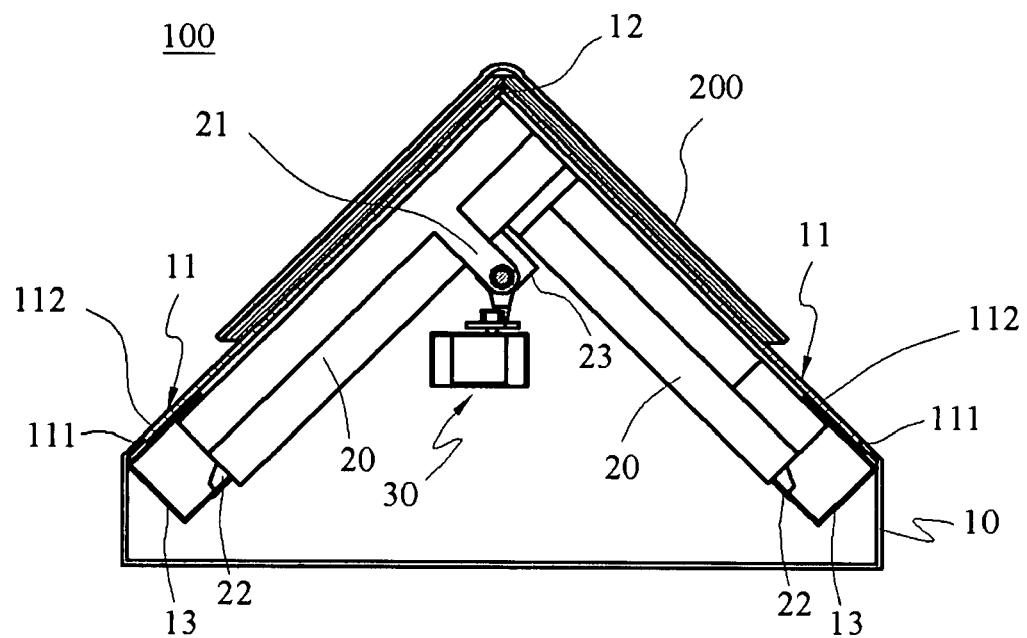
FIG. 5 is a side view of the first embodiment of the present invention.
Figure 6:
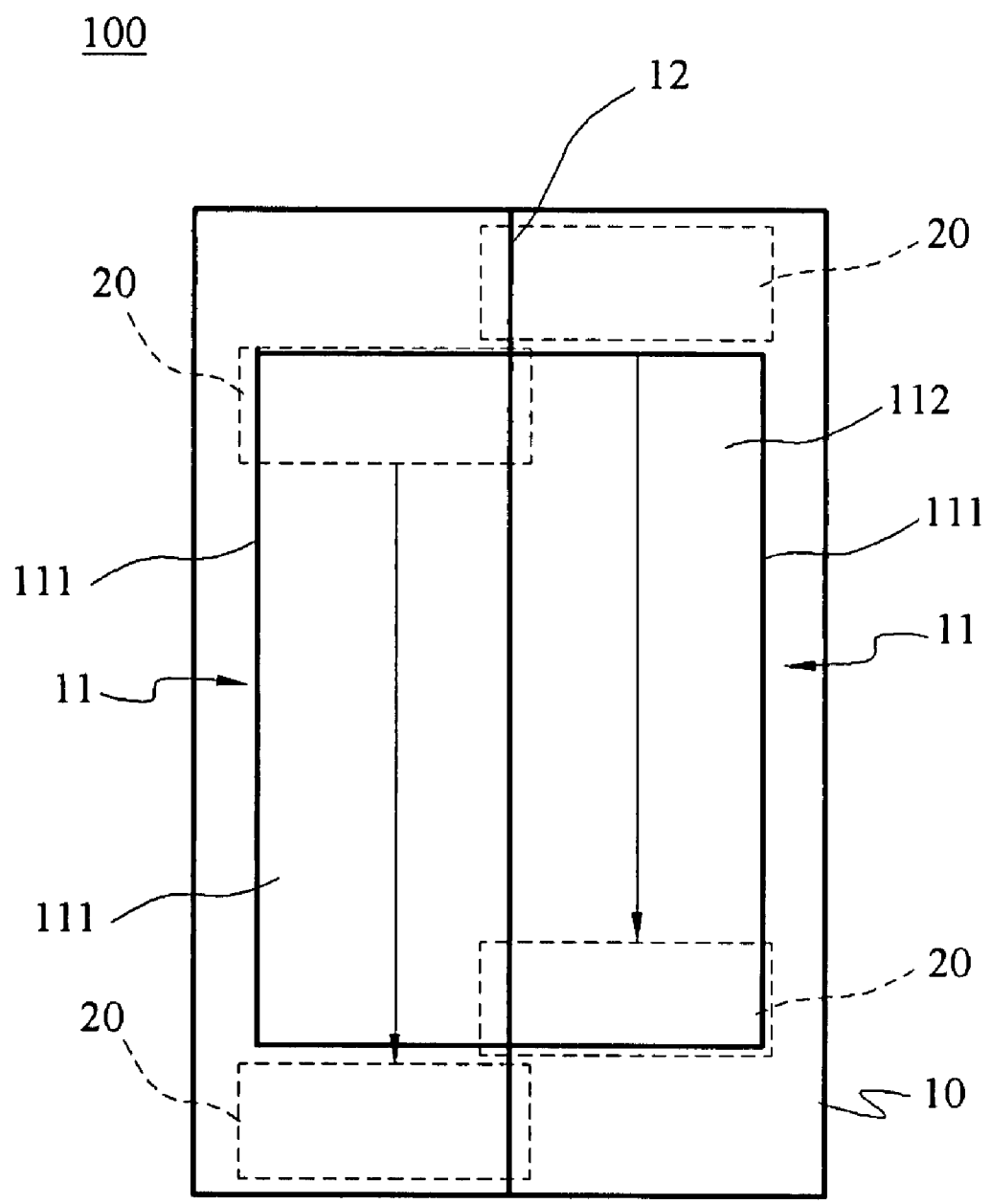
FIG. 6 is a top view of the first embodiment of the present invention.

Referring FIGS. 5 and 6 again, when scanning an opened book 200, the bookbinding cord of the book 200 is placed on the crest line 12 of the housing 10 while two adjacent pages of the book 200 are respectively placed on the two scanning tables 11. As an included angle exists between the two scanning tables 11, the two adjacent pages of the book 200 can be placed flatly on two the scanning tables 11 respectively. The part of the pages near the bookbinding cord will not curve or rise, so as to ensure the image quality when scanning the pages of the book 200. The two image scanning units 20 are driven to move simultaneously in the direction parallel to the crest line 12 and the bookbinding cord, and scan the images of the two pages simultaneously, thereby reducing the time required to scan the images of two adjacent pages in documents bound in volume.

Referring again to FIG. 5, the two image scanning units 20 are respectively disposed in parallel to the corresponding scanning tables 11, such that the distances between the pages on the scanning tables 11 and the image scanning units 20 remain uniform, so the depths of field of the pages to the image scanning units 20 during the scanning are uniform, so as to optimize the image quality. Meanwhile, according to the differences in the assembly tolerances, the distance between the two image scanning units 20 and the corresponding scanning tables 11 can be adjusted precisely and independently via the guide rails 13. Furthermore, as the two image scanning units 20 are pivotally disposed to the shaft 31, the included angle between the two image scanning units 20 and corresponding scanning tables 11. Thus, the image quality gained in scanning the two pages is well optimized.

In the present invention, the shaft 31 of the conveying device 30 is provided to movably support one end of the image scanning units 20, while the driving assembly 30 is provided to move the image scanning units 20. The conveying device 30 is not limited to the combination of the shaft 31, the motor 321, the driving pulley 322, the follower pulley 323, and the driving belt 324, but can be other forms of conveying devices.

Figure 7:
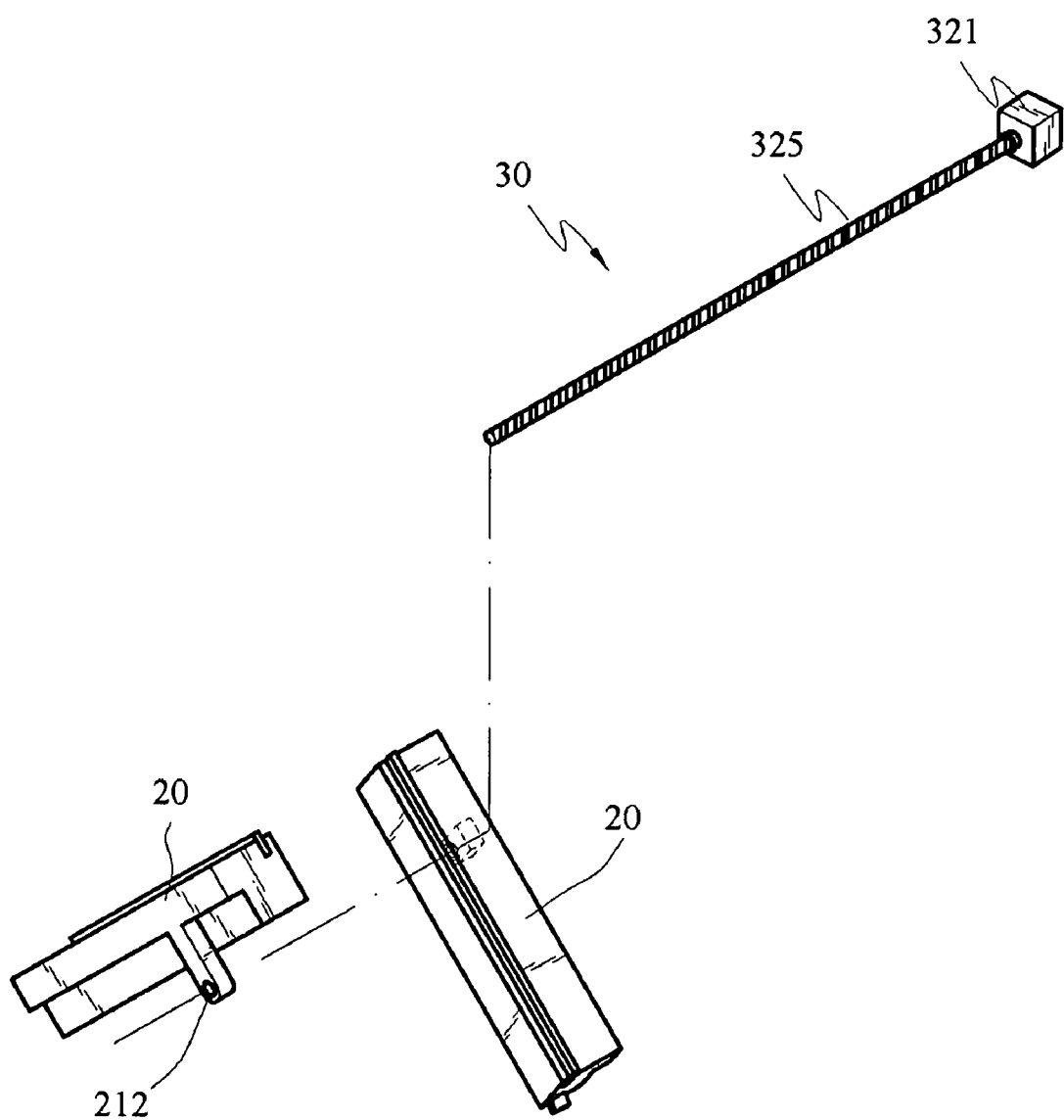
FIG. 7 is an exploded view of a part of the components of a second embodiment of the present invention.
Figure 8:
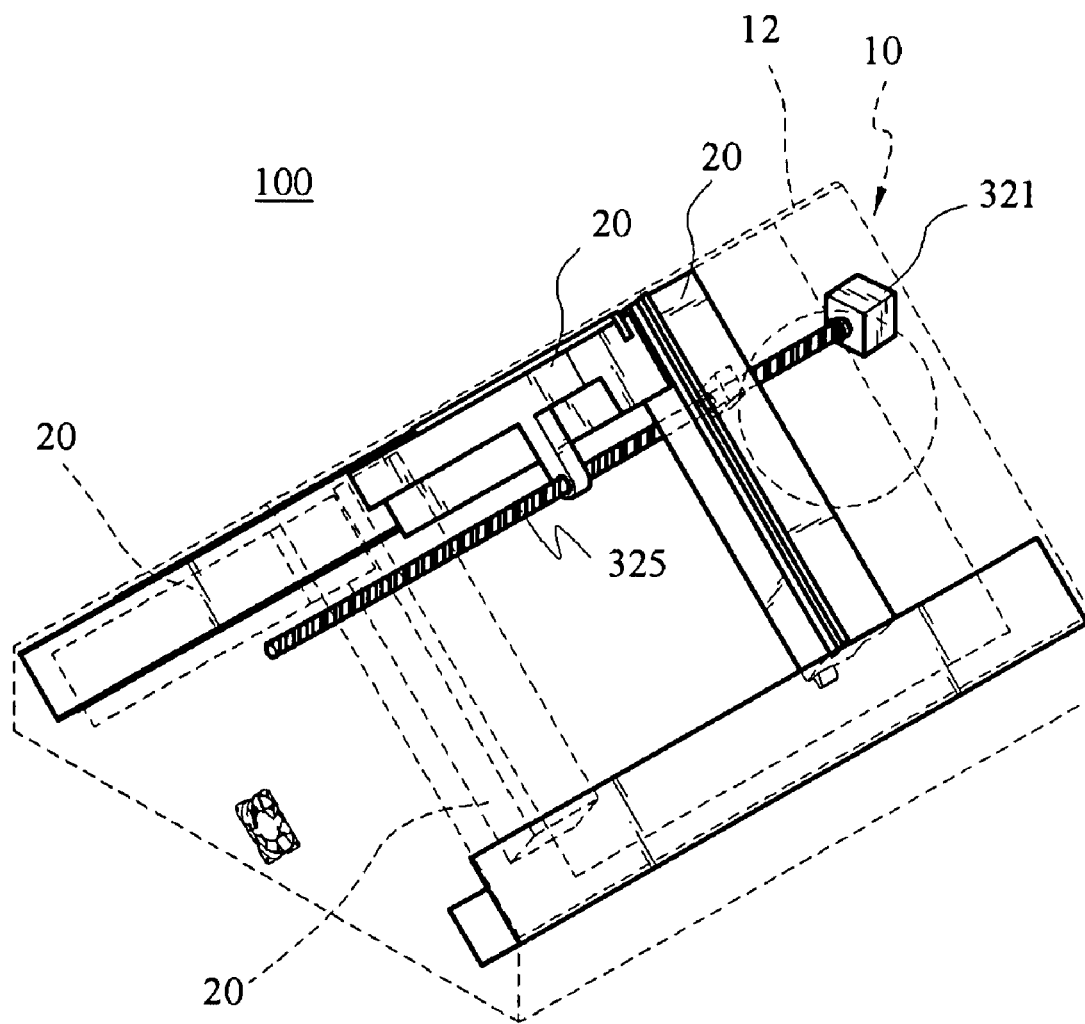
FIG. 8 is a perspective view of the second embodiment of the present invention.

FIGS. 7 and 8 are an exploded view and a perspective view of a part of the components in a book scanner 100 of a second embodiment of the present invention. The conveying device 30 has a screw arbor 325 and a motor 321. The screw arbor 325 is rotatably disposed in the housing 10 in parallel to the crest line 12 of the housing 10 and located below the crest line 12. The motor 321 is fixed in the housing 10 and is connected to screw arbor 325 for rotating the screw arbor 325. Each of the two image scanning units 20 has a screw hole 212. The screw arbor 325 is screwed into both screw holes 212 of the image scanning units 20 to support and drive one end of the image scanning units 20. Being rotated by the motor 321, the screw arbor 325 drives the two image scanning units 20 to simultaneously and scan two pages of a book respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanner, for scanning two adjacent pages in documents bound in volume, comprising:
    a housing, having two scanning tables connected to each other, wherein an included angle is formed between the two scanning tables, a crest line is formed at a connection of the two scanning tables, each of the scanning tables has a window, and the two pages are placed flatly on the two scanning tables respectively;
    two image scanning units, movably disposed in the housing and corresponding to the two scanning tables respectively, for projecting a scanning light through each of the windows respectively so as to scan images of the two adjacent pages through each of the windows;
    a conveying device, disposed in the housing and located below the crest line, wherein an end of each of the two image scanning units is connected to the conveying device, and the two image scanning units are moved by the conveying device relative to the scanning tables of the housing in a direction parallel to the crest line; and
    two guide rails, disposed in the housing, wherein each of the two guide rails respectively disposed on two edges away from the crest line of the two scanning tables, and the other end of the two image scanning units respectively sliding on the two guide rails.

2. The scanner as claimed in claim 1, wherein the window of each of the scanning tables is covered by a transparent plate.

3. The scanner as claimed in claim 1, further comprising a slide element formed on the other end of each image scanning units, for sliding on the guide rail.

4. The scanner as claimed in claim 1, wherein each of the image scanning units is parallel to the corresponding scanning table.

5. A scanner, for scanning two adjacent pages in documents bound in volume, comprising:
    a housing, having two scanning tables connected to each other, wherein an included angle is formed between the two scanning tables, a crest line is formed at a connection of the two scanning tables, each of the scanning tables has a window, and the two pages are placed flatly on the two scanning tables respectively;
    two image scanning units, movably disposed in the housing and corresponding to the two scanning tables respectively, for projecting a scanning light through each of the windows respectively so as to scan images of the two adjacent pages through each of the windows; and
    a conveying device, disposed in the housing and located below the crest line, wherein an end of each of the two image scanning units is connected to the conveying device, and the two image scanning units are moved by the conveying device relative to the scanning tables of the housing in a direction parallel to the crest line;
    wherein the conveying device further comprises:
        a shaft, fixed in the housing, and located below and in parallel to the crest line, wherein each of the image scanning units has a hole, and the shaft passes through both holes of the two image scanning units; and
        a driving assembly, for driving the two image scanning units to move on the shaft relative to the two scanning tables of the housing in a direction parallel to the crest line.

6. The book scanner as claimed in claim 5, wherein each of the image scanning devices respectively has an extending portion with the hole formed thereon.

7. The book scanner as claimed in claim 5, wherein the driving assembly further comprises:
    a motor, fixed in the housing;
    a driving pulley, connected to the motor to be driven by the motor;
    a follower pulley, fixed in the housing, wherein the motor and the follower pulley are located corresponding to two ends of the shaft; and
    a driving belt, installed to the driving pulley and the follower pulley, and driven by the driving pulley and the motor, wherein each of the image scanning units is connected to the driving belt to be driven by the driving belt.

8. The scanner as claimed in claim 7, wherein a connecting portion is formed on each of the image scanning units, and each of the connecting portions is combined with the driving belt.

9. A scanner, for scanning two adjacent pages in documents bound in volume, comprising:
- a housing, having two scanning tables connected to each other, wherein an included angle is formed between the two scanning tables, a crest line is formed at a connection of the two scanning tables, each of the scanning tables has a window, and the two pages are placed flatly on the two scanning tables respectively;
- two image scanning units, movably disposed in the housing and corresponding to the two scanning tables respectively, for projecting a scanning light through each of the windows respectively so as to scan images of the two adjacent pages through each of the windows; and
- a conveying device, disposed in the housing and located below the crest line, wherein an end of each of the two image scanning units is connected to the conveying device, and the two image scanning units are moved by the conveying device relative to the scanning tables of the housing in a direction parallel to the crest line;

wherein the conveying device further comprises:
- a screw arbor, rotatably disposed in the housing, parallel to the crest line of the housing and below the crest line, wherein each of the image scanning units has a screw hole, and the screw arbor is screwed into both screw holes of the image scanning units; and
- a motor, fixed in the housing and connected with the screw arbor, for rotating the screw arbor to drive the two image scanning units to move simultaneously in the direction parallel to the crest line.

\* \* \* \* \*